United States Patent Office 3,781,220
Patented Dec. 25, 1973

3,781,220
CATALYST FOR ETHYLENE POLYMERIZATION AND COPOLYMERIZATION WITH α-OLEFINS
Alexandr Evgenievich Shilov, Vorobievskoe shosse 2, kv. 22, Moscow, U.S.S.R.; Fridrikh Stepanovich Dyachkovsky, ulitsa Tretya 2, kv. 2, p/o Chernogolovka, Moskovskaya oblast, Noginsky raion, U.S.S.R.; Nikolai Mikhailovich Chirkov, ulitsa Vavilova 55/5, kv. 6, Moscow, U.S.S.R.; and Petr Evgenievich Matkovsky, ulitsa Pervaya 16, kv. 26, p/o Chernogolovka, Moskovskaya oblast; Khaim-Mordkhe Aronovich Brikenshtein, ulitsa Vtoraya 5, kv. 1, p/o Chernogolovka, Moskovskaya oblast; Galina Albertovna Beikhold, obschezhitie NNTS, kv. 412, p/o Chernogolovka, Moskovskaya oblast, and Ljudmila Nikolaevna Russian, ulitsa Pervaya 2a, kv. 41, p/o Chernogolovka, Moskovskaya oblast, all of Noginsky raion, U.S.S.R.
No Drawing. Filed May 20, 1971, Ser. No. 145,521
Int. Cl. C08f 3/04
U.S. Cl. 252—429 B    5 Claims

ABSTRACT OF THE DISCLOSURE

A catalyst for ethylene polymerization and copolymerization with α-olefins, comprising a cyclopentadienyl of a Me- or MeO- halide, such as dicyclopentadiene compounds of titanium, vanadium and zirconium chlorides; an organometallic compound, such as diethylaluminum chloride, a Lewis acid such as $AlCl_3$, $BF_3$, $SnCl_4$, $TiCl_4$, ethylaluminum dichloride and tetraalkyl tin compounds and a halogen containing solvent.

As a Lewis acid aluminum trichloride, ethylaluminum dichloride, tetraalkyltin, boron trifluoride or tin tetrachloride is preferably used.

The present catalyst finds application in the processes of producing polymers based on ethylene and may be particularly employed for producing impact-resistant polyethylene.

---

The present invention relates to a catalyst for ethylene polymerization or copolymerization thereof with α-olefins, which finds application in the processes of producing polymers based on ethylene and which may be particularly employed for producing impact-resistant polyethylene.

Known in the present state of the art are catalysts for polymerization of ethylene and copolymerization thereof with α-olefins, which comprise a cyclopentadienyl of a Me- or MeO-halide, an organometallic compound in the medium of hydrocarbon solvents such as dicyclopentadienyltitanium dichloride and an organoaluminum compound in the toluene-heptane medium.

Said catalysts, however, lose their activity and prove to be of low effectiveness due to the high rate of the reduction processes that take place therein.

Thus, for example, when the polymerization process is carried out at a temperature of 0° C., over a period of 2 hours on a catalyst consisting of 0.25 g. of dicyclopentadienyltitanium dichloride and 0.265 g. of diethylaluminum chloride in the ratio Al/Ti=4.0 in the medium of toluene-heptane taken in the amounts of 175 g. and 3 g. respectively, the yield of polyethylene having /η/=3.4 dl./g. and M.P. of 138° C. is 26.9 g. At a temperature of 15–20° C. in 435 g. of toluene and on a catalyst consisting of 0.69 g. of dicyclopentadienyltitanium dichloride and 0.96 g. of diethylaluminum chloride in a ratio of Al/Ti=3.2 over a period of 2.5 hours the yield of polyethylene having /η/=1.5 dl./g. with M.P. of 136° C. is 89.4 g. Under the same conditions, but with the Al/Ti ratio equal to 3.2 and the reaction time of 5.5 hours, 150 g. of polyethylene are produced with /η/=3.0 dl./g. and M.P. of 135° C.

In petrol and heptane the catalysts of the type described are practically inactive.

Also known in the art are catalysts for polymerization of ethylene and copolymerization thereof with α-olefins, that consist of dicyclopentadienyltitanium dichloride and diethylaluminum chloride in the medium of chlorine-containing solvents (1,2-dichloroethane, ethyl chloride).

If the polymerization process is carried out at a temperature of 20° C., ethylene pressure of 1.5 atm. and on a catalyst consisting of $0.2 \cdot 10^{-3}$ mole/l. of cyclopentadientyltitanium dichloride, $2.0 \cdot 10^{-3}$ mole/l. of diethylaluminum chloride in 1 l. of ethyl chloride, then the maximum obtainable yield of polyethylene with an intrinsic viscosity /η/=3.86 dl./g. during 1 hour is 90 g.

The yield of polyethylene for the total weight of the catalyst in this case reaches 280 g./hr.

In said catalytic system the polymerization of ethylene proceeds on ions $Cp_2Ti\pm R$ where $Cp=C_5H_5$; $R=CH_3$ or $C_2H_5$.

Since in the electrolytic dissociation of the formation of complexes into ions

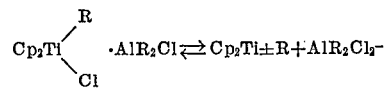

where $Cp=C_5H_5$ and $R=CH_3$ or $C_2H_5$, the values of the constants are low, the effective concentration of active centers in the system is very small, this being the reason for the low polymerization rate and high consumption of the catalyst when polymerizing ethylene by a continuous process.

An increase in the polymerization rate by raising either the temperature or ethylene pressure results in a sharp increase in the molecular weight of the polymer.

It is an object of the present invention to eliminate the above-mentioned disadvantages.

It is therefore a specific object of the invention to enhance the catalyst activity and increase the polymer yield per unit weight of the catalyst by introducing a new component into the catalyst composition.

Said specific object is accomplished by that the catalyst of the invention for the polymerization of ethylene and copolymerization thereof with α-olefins, that comprises a cyclopentadienyl of a Me or MeO-halide, an organometallic compound and a halogen containing solvent, also comprises a Lewis acid.

Maximum activity is observed with such catalysts which comprise, as a Lewis acid, aluminum, trichloride, tin tetrachloride, ethylaluminum dichloride, tetraalkyltin, titanium tetrachloride or boron trifluoride.

Best results, as regards the polymer yield and the polymerization rate, are attainable with the catalysts in which the components are present in the following concentrations: a cyclopentadienyl of (Me- or MeO) halides, 0.05 to $0.3 \cdot 10^{-3}$ mole/l.; a metalloorganic compound, 0.5 to $6.0 \cdot 10^{-3}$ mole/l.; a Lewis acid, 0.05 to $0.6 \cdot 10^{-3}$ mole/l.; a halogen-containing solvent with a mobile halogen atom, 1 lit.

Most active are catalysts having the following composition: dicyclopentadienyltitanium dichloride, 0.05–$0.3 \cdot 10^{-3}$ mole/l.; diethylaluminum chloride, 0.5–$6.0 \cdot 10^{-3}$ mole/l.; ethylaluminum dichloride, tetraalkyltin, tin tetrachloride, titanium tetrachloride, 0.05–$0.6 \cdot 10^{-3}$ mole/l.; ethyl chloride, 1 lit.

The catalyst proposed herein, in contradistinction to those known heretofore, is highly effective and stable during a long period of time. The polymerization process with the use of said catalyst can be easily controlled. The application of said catalyst in the processes of ethylene polymerization and copolymerization thereof with α-olefins allows the yield of the polymer of up to 1 kg. per gram of the catalyst with a high rate of polymerization and good physico-mechanical properties of the resulting polymers. High activity of the present catalyst is conditioned by the presence of Lewis acids in its composition, which enhance the concentration of active centers. Best results, as regards the polymer yield and polymerization rate, are obtained when using catalysts with their components being in the above-specified concentrations.

If an excessive amount of a Lewis acid is introduced into the catalytic system, the catalyst becomes unstable and the polymer yield is reduced. The presence of free Lewis acid brings about dealkylation of the active centers and a sharper reduction of the polymerization rate.

In the composition of the present catalyst as a cyclopentadienyl of a Me- or MeO-halide use is made of dicyclopentadienyl-titanium dichloride, dicyclopentadienylvanadium dichloride, cyclopentadienylvanadium oxydichloride, dicyclopentadienylzirconium dichloride, monocyclopentadienyltitanium trichloride, etc. Most active are those catalysts which contain dicyclopentadienyltitanium dichloride. As a halogen-containing solvent use is made of ethyl chloride, 1,2-dichloroethane, methylene chloride, chloroform, etc.

The process of ethylene polymerization with the use of said catalyst is carried out at a temperature of 20–35° C. and ethylene pressure of 0.5–4 atm. without the use of special molecular-weight regulators.

The molecular weight of polyethylene can be changed either by varying the process conditions (temperature, concentration of the reagents), or by introducing 0.2–5.0 vol. percent of $\alpha$-olefin into the monomer.

The reaction of formation of active centers in the catalytic system is very rapid. Therefore the catalyst can be prepared directly in the polymerization apparatus, whereto all the catalyst components are supplied in any desired succession. The incorporation of Lewis acids into the catalyst composition makes it possible to effect the polymerization process with very small concentrations of the catalyst. This allows the obtaining of an almost ash-free polymer in the process of polymerization. Additional purification of the polymer from the catalyst residues to the ash content of 0.02 wt. percent and lower is effected by centrifugation and further washing of the polymer with the solvent employed in the process, whereby the technological process becomes considerably simplified and less expensive, since the necessity of washing the polymer with water and alcohol is obviated.

Polyethylene which forms with the use of said catalyst contains no branches or double bonds, is highly crystalline, does not contain waxes and is noted for a narrow molecular weight distribution ($Mw/Mn \approx 3.0$).

In its mechanical properties said polyethylene excels all the known types of polyethylenes.

Thus, polyethylene produced with the use of the herein-proposed catalyst, with $/\eta/=1.8$ dl./g., has a yield point of 350–280 kg./cm.$^2$, conventional tensile strength of 220–580 kg./cm.$^2$, elongation at break, 350–1200%, breaking length of fibers, 80–85 km.

For polyethylene produced with the use of prior-art catalysts the breaking length of fibers does not exceed 40–50 km.

For a better understanding of the present invention given hereinbelow are examples which illustrate the effectiveness and activity of the herein-proposed catalysts.

EXAMPLE 1

A reactor preheated to 60° C. is charged under a pressure of $1 \cdot 10^{-2}$ mm. Hg with 1 l. of ethyl chloride, 0.0075 g. of dicyclopentadienyltitanium dichloride, 0.016 g. of tin tetrachloride (Sn/Ti=2.0), and 0.038 g. of diethylaluminum chloride (Al/Ti=10). At a temperature of 20° C. and ethylene pressure of 1.0 atm. during 60 min. 4.0 g. of polyethylene are obtained with intrinsic viscosity $/\eta/=4.7$ dl./g. During the stable period (25 min.) the polymerization rate is 1.75 g./l.·min., and at the 60th minute it decreases to 0.095 g./l.·min.

The yield of polyethylene is 5.3 kg. per gram of dicyclopentadienyltitanium dichloride.

Under the same conditions but with no tin tetrachloride only traces of the polymer (<0.5 g.) are obtained.

EXAMPLE 2

A reactor prepared for carrying out polymerization as described in Example 1 is charged with 0.6 l. of ethyl chloride, 0.005 g. of dicyclopentadienyltitanium dichloride, 0.011 g. of tin tetrachloride and 0.1 g. of ethylaluminum dichloride (in two batches). At a temperature of 20° C. and ethylene pressure of 1.0 atm. during 45 min. 25 g. of polyethylene are obtained (5 kg. of polyethylene per gram of dicyclopentadienyltitanium dichloride) with $/\eta/=4.2$ dl./g.

With the absence of tin tetrachloride under the same conditions practically no polymerization took place.

EXAMPLE 3

A reactor prepared as described in Example 1 is charged with 0.6 l. of ethyl chloride, 0.009 g. of dicyclopentadienyltitanium dichloride, 0.0138 g. of ethylaluminum dichloride and 0.0434 g. of diethylaluminum chloride (diethylaluminum chloride/Ti=10; ethylaluminum dichloride/Ti=3.0).

At a temperature of 30° C. and ethylene pressure of 1.0 atm. during 70 min. 30.0 g. of polyethylene are obtained with the intrinsic viscosity $/\eta/=3.1$ dl./g. Under the same conditions but with the ethylene pressure of 2.0 atm. during 24 min. 24.7 g. of polyethylene are obtained with $/\eta/=5.05$ dl./g.

With no ethylaluminum dichloride traces of polyethylene are obtained.

EXAMPLE 4

A reactor prepared as described in Example 1 is charged with 0.6 l. of ethyl chloride, 0.045 g. of dicyclopentadienyltitanium dichloride, 0.217 g. of diethylaluminum chloride and 0.033 g. of ethylaluminum dichloride (diethylaluminum chloride/Ti=10 and ethylaluminum dichloride/Ti=2.0). At a temperature of 30° C. and ethylene pressure of 1.0 atm. during 43 min. 77.8 g. of polyethylene are obtained with $/\eta/=2.32$ dl./g. Under the same conditions but with the ratio ethylaluminum dichloride/Ti=10.0 during 65 min. 47.6 g. of polyethylene are obtained with $/\eta/=1.3$ dl./g. In the absence of ethylaluminum dichloride during 60 min. there are formed 54 g. of polyethylene with $/\eta/=2.3$ dl./g.

EXAMPLE 5

A reactor prepared in the same manner as in Example 1 is charged with 0.6 l. of ethyl chloride, 0.012 g. of dicyclopentadiethyltitanium dichloride, 0.0578 g. of diethylaluminum chloride and 0.0122 g. of ethylaluminum dichloride (diethylaluminum chloride/Ti=10; ethylaluminum dichloride/Ti=2.0).

In case of ethylene polymerization with 1.0 vol. percent of propylene at a temperature of 30° C. during 35 min. there are formed 31.9 g. of polyethylene with $/\eta/=1.875$ dl./g. and melt index equal to 0.7 g./10 min. Under the same conditions but with 1.4 vol. percent of propylene in the mixture with ethylene during 36 min. there are formed 40.6 g. of polyethylene with $/\eta/=1.425$ dl./g. and melt index equal to 1.06 g./10 min.

EXAMPLE 6

A reactor prepared as described in Example 1 is charged with 0.6 l. of ethyl chloride, 0.0075 g. of dicyclopentadienyltitanium dichloride, 0.0057 g. of titanium tetrachloride and 0.181 g. of diethylaluminum chloride. At a temperature of 20° C., ethylene pressure of 1.0 atm. during 41 min. There are obtained 23.9 g. of polyethylene with $/\eta/=4.45$ dl./g.

EXAMPLE 7

A reactor prepared as in Example 1 is charged with 0.6 l. of ethyl chloride, 0.045 g. of dicyclopentadienyltitanium dichloride, 0.1 g. of tetrabutyltin and 0.21 g. of diethylaluminum chloride. At a temperature of 20° C., ethylene pressure of 1.0 atm. during 95 min. there are obtained 105.8 g. of polyethylene with $/\eta/ = 5.27$ dl./g.

EXAMPLE 8

A reactor prepared as described in Example 1 is charged with 0.6 l. of ethyl chloride, 0.045 g. of dicyclopentadienyltitanium dichloride, 0.02 g. of boron trifluoride and 0.54 g. of diethylaluminum chloride.

At a temperature of 20° C. and ethylene pressure of 1.0 atm. during 100 min. there are obtained 75 g. of polyethylene with $/\eta/ = 2.25$ dl./g.

EXAMPLE 9

A reactor prepared for the polymerization process as described in Example 1 is charged with 0.6 l. of ethyl chloride; 0.015 g. of dicyclopentadienyltitanium dichloride, 0.45 g. of aluminum trichloride and 0.27 g. of diethylaluminum chloride. At a temperature of 20° C. and ethylene pressure of 1.0 atm. during 60 min. 52 g. of polyethylene are obtained with $/\eta/ = 1.83$ dl./g.

What is claimed is:

1. A catalyst for ethylene polymerization consisting essentially of: (a) dicyclopentadienyltitanium dichloride $(0.05–0.3) \times 10^{-3}$ mole/liter; (b) diethylaluminum chloride $(0.5–6.0 \times 10^{-3}$ mole/liter; (c) a Lewis-type acid selected from the group consisting of aluminum chloride, boron trifluoride, tin tetrachloride and tetraalkyl tin $(0.05–0.6) \times 10^{-3}$ mole/liter; (d) ethyl chloride 1 liter.

2. The catalyst of claim 1 wherein the Lewis-type acid is aluminum chloride.

3. The catalyst of claim 1 wherein the Lewis-type acid is boron trifluoride.

4. The catalyst of claim 1 wherein the Lewis-type acid is tin tetrachloride.

5. The catalyst of claim 1 wherein the Lewis-type acid is tetrabutyl tin.

References Cited

UNITED STATES PATENTS

| | | | |
|---|---|---|---|
| 3,472,910 | 10/1969 | Favis | 252—429 B X |
| 2,827,446 | 3/1958 | Breslow | 252—431 R X |
| 2,924,593 | 2/1960 | Breslow | 252—431 R X |
| 2,924,594 | 2/1960 | Breslow | 252—431 R X |
| 3,052,660 | 9/1962 | Osgan | 252—431 R X |
| 2,922,805 | 1/1960 | Kaufman | 252—431 R X |
| 3,161,629 | 12/1964 | Gorsich | 252—431 R X |
| 3,306,919 | 2/1967 | Brantley et al. | 252—431 R X |

PATRICK P. GARVIN, Primary Examiner

U.S. Cl. X.R.

252—429 C, 431 R; 260—88.2 B, 94.9 C, 94.9 E